Aug. 30, 1927.

J. N. ANDERSON 1,640,972

BRAKE

Filed Jan.14, 1927

John N. Anderson INVENTOR

BY Arthur E. Bradley ATTORNEY

Aug. 30, 1927.                J. N. ANDERSON                1,640,972
                                  BRAKE
                            Filed Jan.14, 1927           2 Sheets-Sheet 2

John N. Anderson   INVENTOR
BY                 ATTORNEY

Patented Aug. 30, 1927.

1,640,972

UNITED STATES PATENT OFFICE.

JOHN N. ANDERSON, OF HOBOKEN, NEW JERSEY, ASSIGNOR TO OTIS ELEVATOR COMPANY, OF NEW YORK, N. Y., A CORPORATION OF NEW JERSEY.

BRAKE.

Application filed January 14, 1927. Serial No. 161,096.

This invention relates to brakes of the type in which a plurality of shoes are applied to a brake drum by mechanical means and released by electromagnetic means. More particularly the invention relates to brakes for elevator hoisting machines wherein a pair of brake shoes are arranged to be applied to the opposite sides of a brake drum by means of a spring or springs and an electromagnet is employed to release these brake shoes from the brake drum.

One feature of the invention is the provision of a brake wherein the pressure exerted by one brake shoe on the brake drum is equal to the pressure exerted by the other brake shoe upon the brake drum when the brake is applied, regardless of the adjustment of the applying means.

A second feature of the invention is the provision of a brake comprising a brake releasing mechanism that may be quickly and easily removed for purposes of repair or replacement.

A third feature of the invention is the provision of simple means for causing the clearance between each of the brake shoes and the brake drum, when the brake is released, to be equal and of the desired value.

A fourth feature resides in pivotally supporting the electromagnet at one point on one of the brake arms and at another point on a clapper type armature which in turn is pivotally supported on the other brake arm.

Still another feature of the invention is to provide a brake of the above character that is of simple construction and economical to manufacture as well as reliable and quiet in operation.

Other features and advantages will become apparent from the specification, taken in connection with the accompanying drawings wherein one embodiment of the invention is illustrated.

In the drawings:—

Figure 1:
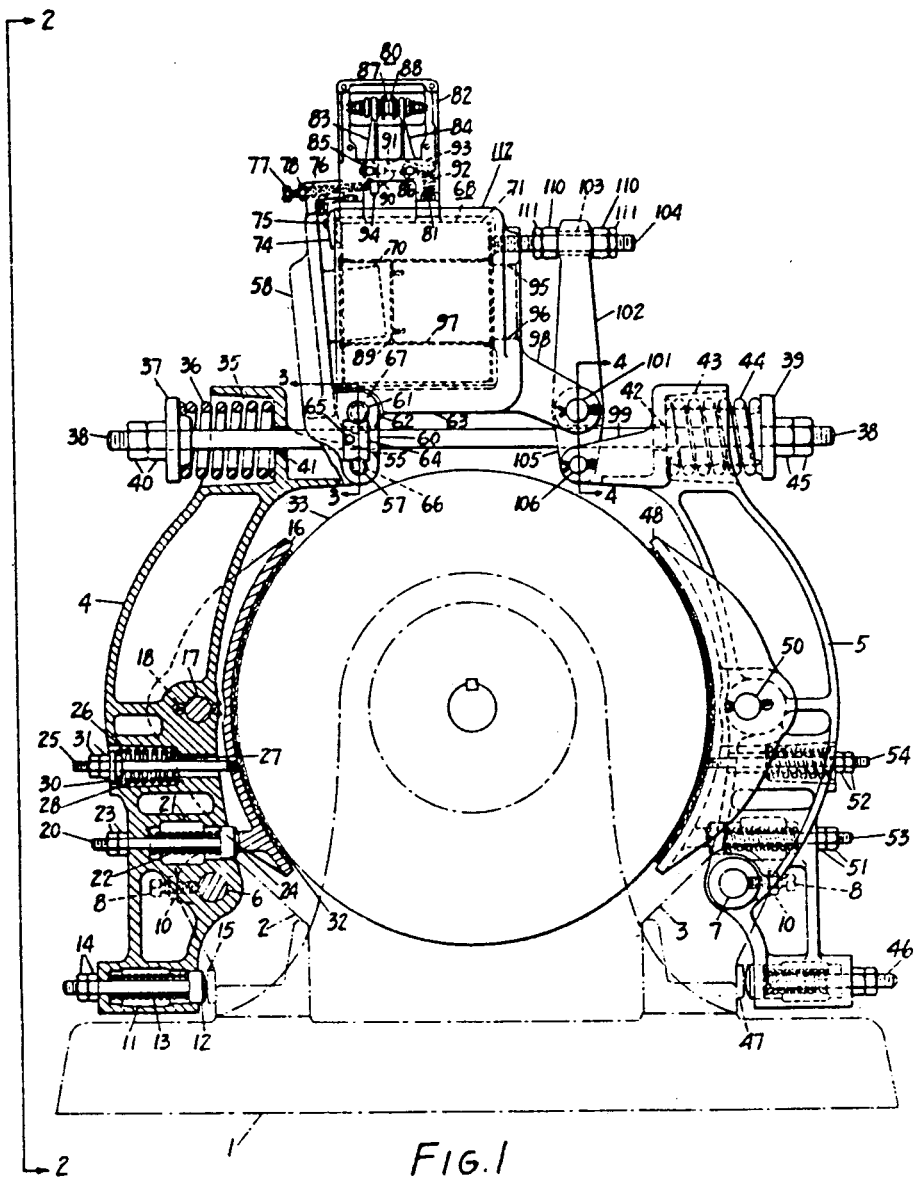
Figure 1 is a view in elevation of the brake with parts broken away.
Figure 2:
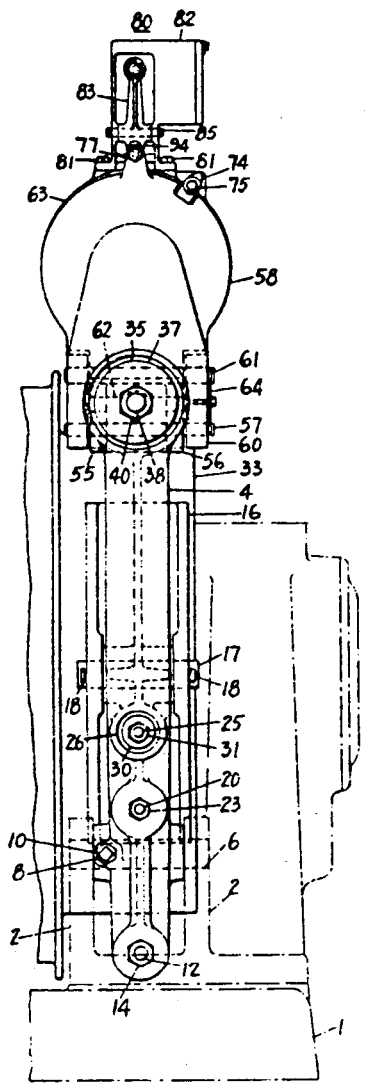
Figure 2 is a view taken along the line 2—2 of Figure 1.
Figure 3:
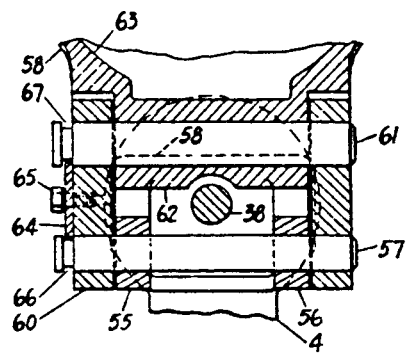
Figure 3 is a sectional view taken along the line 3—3 of Figure 1.
Figure 4:
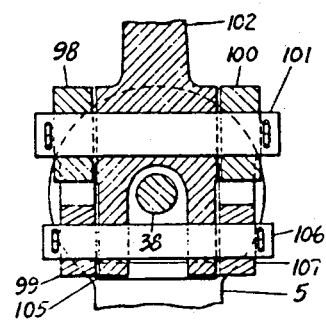
Figure 4 is a sectional view taken along the line 4—4 of Figure 1.

Referring to Figure 1, a base 1 has pedestals 2 and 3 formed thereon. Brake arms 4 and 5 are pivotally supported on the pedestals 2 and 3 by means of pins 6 and 7 extending through apertures in the brake arms and through alined apertures provided in the pedestals. Set screws 8 and lock nuts 10 secure the pins 6 and 7 to the brake arms 4 and 5. The lower portion of the brake arm 4 is provided with a cylindrical recess 11. A headed stop pin 12 is positioned within the recess 11 and has its end extending through an aperture provided in the closed end of the recess 11. A compression spring 13 surrounds the stop pin 12 within the recess 11 and bears at one end against the closed end of the recess 11 and at the other end against the head of the pin 12. Nuts 14 are threaded on the end of the pin 12 and serve to adjustably position the pin within the recess 11. The head of stop pin 12 is arranged to engage a stop lug 15 formed on the base 1.

A brake shoe 16 is pivotally mounted on a pin 17 that extends through an aperture provided in the brake arm 4. Pin 17 is retained in position with respect to arm 4 and shoe 16 as by cotter pins 18. A headed pin 20 is positioned within a recess 21 provided in the brake arm 4 in the same manner that pin 12 is positioned within recess 11. The length of the compression spring 22 surrounding pin 20 may be adjusted by means of nuts 23. The head of the pin 20 engages a stop lug 24 formed on the brake shoe 16. A rod 25 is threaded into the brake shoe 16 and extends through an aperture 26 formed in the brake arm 4. The aperture 26 is enlarged for a portion of its length forming a shoulder 27. A compression spring 28 is positioned within this enlarged portion of the aperture 26. Spring 28 bears at one end against the shoulder 27 and at the other end against a spring seat 30 carried by the rod 25. Nuts 31 are threaded on the rod 25 and abut the spring seat 30. By adjusting nuts 23 and 31 the brake shoe 16 may be swung about its pivot pin 17 so as to cause the gripping surface of the brake lining 32 to be concentric with the surface of the brake drum 33. These nuts are adjusted so that when the brake is released there is the same clearance between the brake drum 33 and all portions of the gripping surface of the brake lining 32.

The upper portion of the brake arm 4 is formed with a recess 35 within which a compression spring 36 is positioned. Spring 36 bears at one end against the closed end of the recess 35 and at the other end against a spring seat 37 mounted on a rod 38. Nuts 40 are threaded on the rod 38 and retain the spring seat 37 in position on this rod. Rod 38 extends through an aperture 41 provided in the brake arm 4 and through a similar aperture 42 provided in the brake arm 5. Brake arm 5 has a recess 43 similar to the recess 35 in brake arm 4. A compression spring 44 is positioned within recess 43 and bears at one end against the closed end of this recess and at the other end against a spring seat 39 mounted on the rod 38. Nuts 45 are threaded on the rod 38 and retain the spring seat 39 in position on this rod.

Brake arm 5 is similar in construction to brake arm 4. Brake arm 5 carries a headed stop pin 46 that is adapted to engage a stop lug 47 formed on the base 1. The brake shoe 48 carried by brake arm 5 may be swung about its pivot pin 50 by turning nuts 51 and 52 threaded on the pin 53 and rod 54 respectively.

Brake arm 4 has lugs 55 and 56 formed on its upper portion. A pin 57 extends through aligned apertures provided in lugs 55 and 56. An armature 58 has a bifurcated end portion 60 that is pivoted on the pin 57. The bifurcated end portion 60 of the armature 58 is also pivoted on a pin 61. Pin 61 extends through apertures provided in the end portion 60 and through an aperture provided in a boss 62 formed on a magnet casing 63 of a magnet 68. A locking plate 64 is secured to the end portion 60 by means of a screw 65. Locking plate 64 extends into annular recesses 66 and 67 provided in pins 57 and 61 and retains these pins in position with respect to the armature 58 and magnet casing 63.

The armature 58 has a cylindrical boss 70 projecting therefrom. Boss 70 extends into coil 71 of brake magnet 68. The coil 71 is retained within brake magnet casing 63 by a clip 74 and screw 75. The upper portion of armature 58 is provided with an aperture 76. Aperture 76 is threaded for a portion of its length and a screw 77 is adjustably positioned within this aperture. A nut 78 secures the screw 77 in its adjusted position within aperture 76. Screw 77 is arranged to operate a brake switch 80 secured by screws 81 to the magnet casing 63.

Brake switch 80 comprises a casing 82 and switch levers 83 and 84 pivotally mounted on pins 85 and 86 carried by casing 82. Switch levers 83 and 84 carry insulated contacts 87 and 88. A lug 90, formed on switch lever 83, coacts with a lug 91 formed on switch lever 84. A compression spring 92 bears at one end against the casing 82 and at the other end against a lug 93 formed on switch lever 84. Spring 92 causes contacts 87 and 88 to be in engagement except when these contacts are held out of engagement by the action of screw 77 upon lever 83, as will appear from later description. Screw 77 is adjusted in armature 58 so that the end of this screw just touches a lug 94 formed on switch lever 83 when the brake is applied and the contacts 87 and 88 are in engagement.

The magnet casing 63 is provided with an aperture 95 within which the reduced end 96 of the core 97 of magnet 68 is secured. A disk 89 of leather or other cushioning material is secured by screws to the free end of core 97. Lugs 98 and 100 are formed on the end of casing 63 and are provided with aligned apertures. A pin 101 extends through the aligned apertures in the lugs 98 and 100 and is retained in these apertures by cotter pins. A lever 102 is pivotally mounted on the pin 101. The upper end of lever 102 is provided with an aperture 103. A rod 104 is threaded into an aperture provided in the magnet casing 63 and extends loosely through aperture 103 in the lever 102. Nuts 110 and lock nuts 111 are threaded on the rod 104 and are positioned adjacent the opposite sides of the lever 102. The lower portion 105 of the lever 102 is bifurcated. A pin 106 extends through aligned apertures provided in the bifurcated portion 105 of lever 102 and through similar apertures provided in two lugs 99 and 107 formed on the brake arm 5. Pin 106 is retained in these apertures by cotter pins extending through this pin and positioned adjacent the lugs 99 and 107.

The brake magnet 68, the armature 58 and lever 102 constitute a unit 112 that is supported by the brake arms 4 and 5. By merely removing pins 57 and 106, this unit 112 may be lifted from the brake arms 4 and 5.

While the coil 71 of the brake magnet 68 is deenergized, the compression springs 36 and 44, acting through the brake arms 4 and 5 and pins 17 and 50, cause the brake shoes 16 and 48 to grip the brake drum 33. Since the outer ends of springs 36 and 44 are connected by the rod 38, the force exerted by one of these springs on its brake arm is equal to the force exerted by the other spring on its brake arm. The pressure exerted by one brake shoe on the brake drum 33 is therefore equal and opposite to the pressure exerted by the other brake shoe on the brake drum, thereby distributing wear equally to both brake shoes and eliminating side pressure on the brake drum shaft bearings.

When the coil 71 of the brake magnet 68 is energized the boss 70 of armature 58 is attracted by the core 97. The resulting force couple thusly applied to the armature 58 causes this armature to turn, exerting equal and opposite horizontal forces on the pivotal pins 61 and 57. The force exerted upon pin 61 acts through the brake magnet casing 63, pin 101, lever 102 and pin 106 to apply a force to brake arm 5. This force overcomes the pressure of spring 44 and causes the brake shoe 48 to disengage the brake drum. The force exerted upon pin 57 acts upon brake arm 4 and overcomes the pressure of spring 36 and causes the brake shoe 16 to disengage the brake drum. The armature 58 continues to turn until its boss 70 strikes the disk 89 on the end of core 97 and is thereby brought to rest with a minimum of noise.

The movement of armature 58 also causes screw 77 to move towards the brake switch 80. This movement of screw 77 causes switch levers 83 and 84 to move so as to effect the disengagement of their contacts 87 and 88.

Under certain circumstances one brake arm may move before the other and thereby disengage its brake shoe from the brake drum while the other remains in engagement with the brake drum. In such event the stop pin 12 or 46, according to which arm has first moved, will come up against one of the stop lugs 15 or 47 and prevent further movement of this arm. Further movement of the armature 58 will result in movement of the other arm to release its brake shoe. By properly adjusting the stop pins 12 and 46, the lifting of both shoes from the brake drum is insured whenever the brake magnet coil is energized. In addition to the insuring of the lifting of both brake shoes in releasing, the stop pins 12 and 46 cushion the brake arms in their outward movement by compressing the springs surrounding these stop pins.

The pressure with which the brake shoes are applied to the brake drum may be varied by adjusting the nuts 40 and 45 at the ends of rod 38. Should the nuts at one end of the rod 38 be adjusted without adjusting the others, the pressure of springs 36 and 44 will nevertheless always be equal, owing to the equalizing feature of this rod. One of these springs may be omitted if desired and the device will function properly.

In the event that it is desired to adjust the clearance between the brake shoes and the brake drum, this may be accomplished by turning nuts 110 and lock nuts 104 on rod 111 so as to move lever 102 about its pivot pin 101. This movement of lever 102 varies the horizontal distance between pins 61 and 106, so that when the brake is released and the boss 70 of armature 58 is in engagement with disk 89 of core 97 a corresponding variation is made in the clearance of the brake shoes. Should lever 102 be moved in a clockwise direction about its pivot pin, thereby bringing pin 106 closer to pin 61, then on the release of the brake, the clearance between the brake shoes and the brake drum is lessened. Conversely, should lever 102 be moved in a counterclockwise direction, thereby moving pin 106 further from pin 61, then on the release of the brake, the clearance between the brake shoes and the brake drum is increased.

Inasmuch as the unit 112 may be assembled on the brake arms or taken therefrom by merely inserting or removing two pins, the time consumed in making repairs or in replacing old and worn parts is reduced to a minimum.

Owing to the arangement of the parts of the brake and the large bearing surfaces provided, there is little wear and the lost motion in the moving parts is very small. Consequently there is but a small air gap between the armature 58 and core 97 when the brake is applied. The resulting small motion and low inertia of the moving parts insures a minimum of slamming of the armature against the core when the brake is released, a smooth application of the shoes when the brake is applied, and quick action in both releasing and applying.

Furthermore, it is to be noted that the electromagnet and its armature are entirely supported by the brake arms, thereby eliminating a separate support for these members and producing a simple structure that may be assembled or taken apart with ease and rapidity.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A brake comprising, a plurality of brake arms, an electromagnet supported at one point on one of said brake arms, and an armature pivoted at one point on another of said arms and pivoted at another point on said electromagnet.

2. A brake comprising, a pair of brake arms, an electromagnet pivotally connected to one of said arms, and an armature pivoted at one point on said electromagnet and pivoted at another point on the other of said arms.

3. A brake comprising, a brake drum, a pair of brake shoes, a brake arm supporting each of said brake shoes, spring means for causing said brake arms to move said brake shoes into engagement with the brake drum, an armature pivoted on one of said brake arms, and a magnet pivotally connected to said armature, said magnet being arranged to actuate said armature and thereby cause the brake arms to move said brake shoes so as to release the brake drum.

4. A brake comprising, a brake drum, a pair of brake shoes, a brake arm supporting each of said brake shoes, spring means for causing said brake arms to move said brake shoes into engagement with the brake drum, an armature pivoted on one of said brake arms, and a magnet pivotally supported at one end of said armature and at the other end on the other brake arm, said magnet being arranged to actuate said armature and thereby cause the brake arms to move said brake shoes so as to release the brake drum.

5. A brake comprising, a brake drum, a pair of brake shoes, a brake arm supporting each of said brake shoes, spring means for causing said brake arms to move said brake shoes into engagement with the brake drum, an armature pivoted on one of said brake arms, a magnet pivotally connected to said armature, said magnet being arranged to actuate said armature and thereby cause the brake arms to move said brake shoes so as to clear the brake drum, and adjustable means connecting said magnet to the other brake arm, said adjustable means being arranged to vary the clearance between the brake shoes and the brake drum.

6. A brake comprising, a brake drum, a pair of brake shoes, a brake arm supporting each of said brake shoes, spring means for causing said brake arms to move said brake shoes into engagement with the brake drum, an armature pivoted on one of said brake arms, a magnet pivotally connected to said armature, said magnet being arranged to actuate said armature and thereby cause the brake arms to move said brake shoes so as to clear the brake drum, a lever connecting said magnet to the other brake arm, and means for adjusting the position of said lever, whereby the clearance is varied between the brake shoes and the brake drum when the brake is released.

7. A brake comprising, a brake drum, a pair of brake shoes, a brake arm supporting each of said brake shoes, spring means for causing said brake arms to move said brake shoes into engagement with the brake drum, an armature pivoted on one of said brake arms, a magnet pivotally connected to said armature, said magnet being arranged to actuate said armature and thereby cause the brake arms to move said brake shoes so as to clear the brake drum, a lever connecting said magnet to the other brake arm, a threaded rod carried by the magnet and extending through an aperture in said lever, and nuts mounted on said rod and arranged to vary the position of said lever, whereby the released position of the brake shoes is adjusted.

8. A brake comprising, a brake drum, a pair of brake shoes, a brake arm supporting each of said brake shoes, spring means for causing said brake arms to move said brake shoes into engagement with the brake drum, an armature pivoted to one of said brake arms, a magnet pivotally connected to said armature, said magnet being arranged to actuate said armature and thereby cause the brake arms to move said brake shoes so as to clear the brake drum, a lever pivotally connected to said magnet and to the other brake arm, and means for causing said lever to be rigidly connected to the magnet, said means being capable of adjusting the lever about its pivotal connection with the magnet, whereby the released position of the brake shoes is adjusted.

9. In a brake having a pair of brake arms, a releasing mechanism, said releasing mechanism comprising an armature supported on one brake arm, and a magnet supported at one end on said armature and at its other end on the other brake arm.

10. In a brake; a brake drum; a pair of brake arms; a brake shoe carried by each arm between its ends to cooperate with said brake drum; and a unit removably mounted on said brake arms for releasing said brake shoes from the brake drum, said unit comprising an armature, a magnet for said armature and adjusting means arranged to vary the clearance between the brake shoes and the brake drum.

11. In a brake having a pair of opposed brake arms, a removable releasing mechanism, said releasing mechanism comprising an armature pivotally supported on one brake arm, and a magnet pivotally supported at one end on said armature and connected at its other end to the other brake arm.

12. In a brake having a pair of opposed brake arms, a removable releasing mechanism, said releasing mechanism comprising an armature pivotally supported on one brake arm, a magnet pivotally supported at one end on said armature, and a lever adjustably pivoted on the other end of said magnet, said lever being pivotally supported on the other brake arm.

13. A releasing mechanism for brakes comprising, a magnet, an armature pivotally connected to said magnet and arranged to be actuated thereby, a lever pivotally mounted on said magnet whereby said lever may be angularly adjusted with respect to said magnet and means for securing said lever in its adjusted position with respect to said magnet.

In testimony whereof, I have signed my name to this specification.

JOHN N. ANDERSON.